US007815234B2

(12) United States Patent
Parris et al.

(10) Patent No.: US 7,815,234 B2
(45) Date of Patent: Oct. 19, 2010

(54) MAGNETIC TOOL CLEANER

(76) Inventors: Earl H. Parris, 31 N. Washington St., Summerville, GA (US) 30747; John Michael Kay, 1947 Old River Rd., Rome, GA (US) 30165

( * ) Notice: Subject to any disclaimer, the term of this patent is extended or adjusted under 35 U.S.C. 154(b) by 1109 days.

(21) Appl. No.: 11/298,125

(22) Filed: Dec. 9, 2005

(65) Prior Publication Data

US 2007/0132256 A1 Jun. 14, 2007

(51) Int. Cl.
*B25J 15/06* (2006.01)

(52) U.S. Cl. .................................................... 294/65.5

(58) Field of Classification Search ................ 294/65.5; 335/285; 81/125

See application file for complete search history.

(56) References Cited

U.S. PATENT DOCUMENTS 2,547,990 A * 4/1951 Willms ...................... 294/65.5
2,834,241 A * 5/1958 Chowning ................. 294/65.5
2,970,002 A * 1/1961 Laviano ..................... 294/65.5
3,771,084 A * 11/1973 Thon .......................... 335/285
4,581,962 A 4/1986 Marbourg
4,620,739 A * 11/1986 Coralline ................... 294/65.5
4,919,020 A * 4/1990 Huebschen .................. 81/125
5,169,193 A * 12/1992 Stelmach ................... 294/65.5
5,288,119 A * 2/1994 Crawford et al. ........... 294/65.5
5,433,492 A * 7/1995 Glossop, Jr. ............... 294/65.5
5,799,999 A * 9/1998 Schneider et al. .......... 294/65.5
6,048,073 A * 4/2000 Shiao ........................ 294/65.5
6,056,339 A * 5/2000 Berger ....................... 294/65.5
6,321,626 B1* 11/2001 Liu ........................... 294/65.5
2005/0017526 A1* 1/2005 Arrotta ...................... 294/65.5

* cited by examiner

*Primary Examiner*—Paul T Chin
(74) *Attorney, Agent, or Firm*—Monty Simmons; Simmons Patents

(57) ABSTRACT

An apparatus and method for cleaning metal debris from a magnetic tool (some tools of which have magnetic properties) is disclosed. For one embodiment, the magnetic cleaner comprises a magnetic element suitably sized to interface with a surface of a tool associated with metal debris. A housing comprising a magnetic interface constructed of magnetically transparent material surrounds the magnetic element wherein the remainder of the housing is optionally constructed from material that forms a magnetic barrier. The magnetic element may be movably associated with the housing allowing the magnetic element to be associated/disassociated with the housing magnetic interface.

5 Claims, 5 Drawing Sheets

MAGNETIC TOOL CLEANER

TECHNICAL FIELD OF THE INVENTION

The present invention relates to a magnetic tool cleaner for cleaning metal debris from tools such as magnetic tip nut drivers.

BACKGROUND OF THE INVENTION

Tools having magnetic properties are becoming increasingly popular. Such tools are used by professionals and non professionals during a variety of mechanical and assembly tasks. For example, steel buildings are becoming an increasingly popular alternative to wood buildings because steel buildings typically offer faster construction times, improved strength, versatility, and reduced costs. Such buildings are typically constructed using metal screws and bolts. As a result, nut driver bits configured for use with an electrical drill have become a common tool used by professional installers of steel/metal building. Additionally, many such professionals find the use of magnetic tip nut driver bits helpful as the magnetic properties of such nut drivers hold a metal screw in the nut driver giving the installer a "free" hand to use for other tasks.

One problem encountered by those who use magnetic tip nut drivers relates to the build up of metal debris in the nut driver. When using a magnetic tip nut driver, metal slivers from the nut or screw can build up in the nut driver. Eventually enough metal slivers build up in the nut driver to prevent the head of the nut from fitting properly in the nut driver. When this occurs, the nut driver bit becomes unfit for use until such metal slivers are removed. However, many professional installers find the task of removing the metal slivers a nuisance and/or too time consuming. As a result, such installers often remove the "dirty" magnetic tip nut driver from the drill and install a new nut driver. Indeed, such installers often throw away a perfectly good nut driver instead of cleaning it. What is needed is an apparatus and method for quickly and easily cleaning the metal debris from tools such as magnetic tip nut drivers.

SUMMARY

Some of the objects and advantages of the invention will now be set forth in the following description, while other objects and advantages of the invention may be obvious from the description, or may be learned through practice of the invention.

Broadly speaking, a principle object of the present invention is to provide a tool cleaner that is configured for removing metal debris from a tool comprising magnetic properties.

Another general object of the present invention is to provide a magnetic cleaner that is configured for removing metal debris from a tool comprising magnetic properties where the magnetic cleaner can be operated with one hand.

Still another general object of the present invention is to provide a magnetic cleaner that is configured for removing metal debris from a tool comprising magnetic properties while minimizing magnetic field emissions when not in use.

A further object of the present invention is to provide a magnetic cleaner that is configured for removing metal debris from a tool comprising magnetic properties where the metal debris is automatically dissociated from the magnetic cleaner when a user removes the magnetic cleaner from the tool being cleaned.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

One exemplary embodiment of the present invention relates to novel implementations of magnetic theory for cleaning metal debris from a tool. The apparatus comprises a housing having a generally cylindrical shape having a first end and an opposing second end. The first end of said housing is preferably constructed at least partially of magnetically transparent material. A magnetic element is disposed within said housing and is configured for associating with the first end of the housing. The first end of the housing is suitably sized for cleaning metal debris from a surface of a tool. For example, if the tool being cleaned is a magnetically tipped nut driver, the first end of the housing would be suitably shaped to remove metal debris from the nut driver tip.

For one embodiment of the invention, the magnetic element is a permanent magnet having a generally cylindrical shape where the magnetic element is movably associated with the housing. This allows the magnetic element to be moved into a position of association with the first end of the apparatus. Once in position, the first end is associated with a tool (if not already associated with a tool) so that a magnetic association is established between the first end and metal debris contaminating such tool. When the apparatus is not being used to clean a tool, the magnetic element is disassociated for the first end and the magnetic association between the magnetic element and the debris is broken.

The apparatus may further comprise a resilient element in mechanical communication with said magnetic element and said housing. One embodiment of a resilient element is a spring which may be composed of non Ferris steel such as stainless steel. The resilient element defines a bias force that tends to keep the magnetic element from associating with said first end. The apparatus further comprises a magnetic element mover associated with the housing and configured for moving the magnetic element toward said first end of the housing until the magnetic element is associated with the first end of the housing. Generally speaking, the magnetic element is considered associated with the first end of the housing when either (a) the magnetic element forms a magnetic association with metal debris associated with a tool of sufficient strength to remove the debris from the tool or (b) the magnetic element reaches the mechanical limits of possible movement. The magnetic element mover actuation technique may comprise any number of well known techniques in the art. When a user is no longer actuating the magnetic element mover, the resilient element disassociates the magnetic element from the first end of the housing.

The apparatus may further comprise a resistive element that provides a damping force that delays the disassociation of the magnetic element from the first end. For this configuration, the user associates the first end of the apparatus housing with the tool to be cleaned, actuates and releases the magnetic element mover, the magnetic element forms a magnetic attraction with the metal debris and the user removes the apparatus from the tool and the debris "automatically" (i.e. a user does not need to clean the debris from the cleaner) falls away form the cleaner as the magnetic element returns to its disassociated position.

The magnetic element mover may comprise a plunger element having a generally cylindrical shape defining a first plunger end and a second plunger end. The second plunger end is in mechanical communication with the magnetic element within the housing. The first plunger end extends through the second end of said housing to a point outside of the housing. If the housing is associated with an end cap, the second end also extends through the end cap. The plunger element is slideably associated with said housing so that a user actuates the magnetic element mover by pressing on the first plunger end.

The housing may further comprise a magnetic barrier disposed within said housing (or around the outside of the housing). The magnetic barrier is generally cylindrical shape and suitably sized to at least partially enclose the magnetic element. The magnetic barrier may comprise a first barrier end defining a self-sealing passage through which at least part of the magnetic element travels when the user actuates the magnetic element mover. Suitable materials for forming a magnetic barrier include a nickel based alloy foil and a cobalt based alloy foil. The housing may further comprise an annular plate composed of a material that defines a magnetic barrier. The annular plate is preferably positioned between the magnetically transparent first end and the remainder of the housing body.

Yet another exemplary embodiment of the present invention relates to a magnetic cleaner for cleaning metal debris from a tool, the magnetic cleaner comprising a housing defining a magnetic interface suitably sized to interface with a tool so that metal debris can be removed from the tool. A magnetic element is disposed inside the housing and is suitably sized for associating with said magnetic interface. The magnetic interface portion of the housing is preferably constructed at least partially of magnetically transparent material. At least a portion of the remainder of the housing may be constructed from a material that defines a magnetic barrier configured for attenuating magnetic fields. One example of a magnetic barrier is a magnetic shield insert configured to fit inside the housing between the magnetic element and the housing. Suitable materials for forming a magnetic barrier include a nickel based alloy foil and a cobalt based alloy foil. Alternatively, the housing may composed of a magnetically transparent material lined (coated) with a shielding substance such as a nickel based alloy coating.

The magnetic component may be a permanent magnet or an electromagnetic. For embodiments comprising an electromagnet, the magnetic cleaner further comprises an core extending through a coil of wire where the coil is electrically associated with a power source through a switch. The coil is configured with a first coil contact and a second coil contact. The first coil contact is electrically associated with one pole of a power source. The second coil contact is associated with a first switch contact. The switch further comprises a second switch contact electrically associated with a second pole of the power source. The switch comprises a switching element that associates the power source to the coil when the switch is actuated by a user and disassociates the power source from the coil when the user is not actuating the switch.

Another exemplary embodiment of the present invention concerns methodology for removing metal debris from a tool. The method comprises the steps of providing a magnetic cleaner comprising a housing defining a housing interface. For clarity, the housing's magnetic interface is referred to as the housing interface. The housing contains a magnetic element mechanically associated with the housing interface. The next step is to associate the housing interface with an area of a tool associated with metal debris so that the metal debris becomes magnetically associated with the magnetic element. Next the housing interface is disassociated from the tool while maintaining the magnetic association between the metal debris and the magnetic element so that the metal debris attaches to the magnetic cleaner instead of the tool.

The method may further comprise the steps of forming at least part of the housing interface from magnetically transparent material and forming at least part of the remainder of the housing from a material that defines a magnetic barrier.

The method may further comprise the steps of movably associating the magnetic element with the housing. A resilient element is provided that defines a bias force that tends to dissociate the magnetic element from the housing interface. A magnetic element mover is provided for associating the magnetic element-with the housing interface when a user actuates said magnetic element mover. An additional step is to provide a magnetic barrier comprising a self-sealing passage between the housing interface and the magnetic barrier. The magnetic barrier at least partially encloses the magnetic element. At least part of the magnetic element travels through the self-sealing passage and associates with the housing interface when a user actuates the magnetic element mover.

Additional embodiments of the present subject matter, not necessarily expressed in this summarized section, may include and incorporate various combinations of aspects of features or parts referenced in the summarized objectives above, and/or features or components as otherwise discussed in this application.

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Figure 1A:
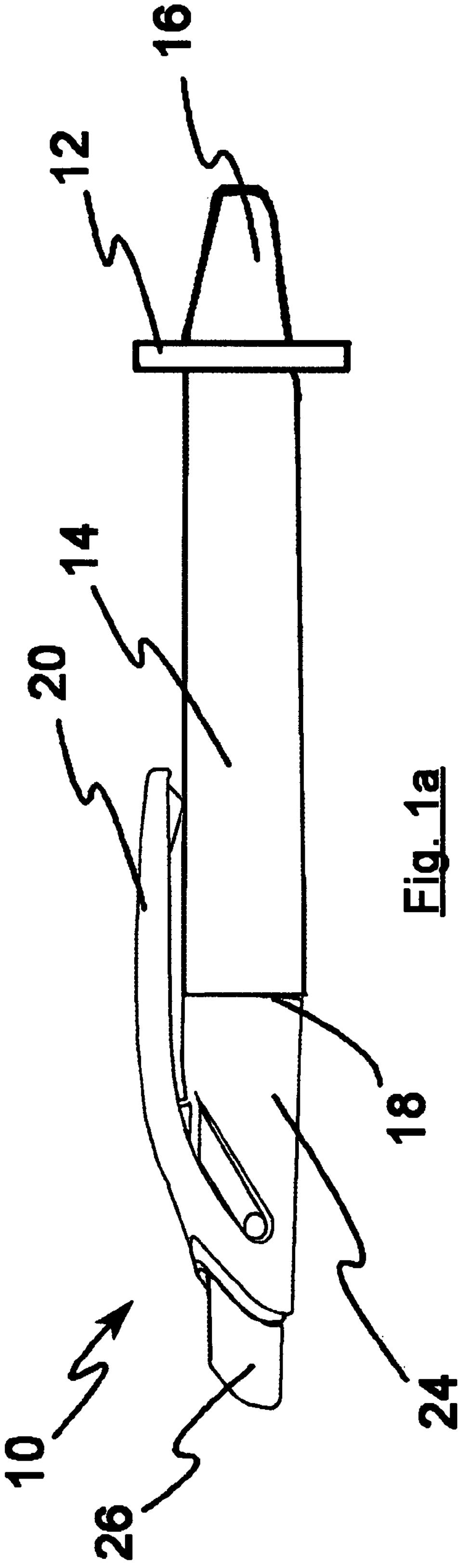
FIG. 1*a* is a side view of a magnetic cleaner comprising an end cap, a plunger, and an annular plate according to one embodiment of the invention.

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

For the purposes of this document two or more items are "associated" by bringing them together or into relationship with each other in any number of ways including a direct or indirect physical connection. Similarly, two or more items are "electrically associated" by bringing them together or into relationship with each other in any number of ways including: (a) a direct, indirect or inductive communication connection, and (b) a direct/indirect or inductive power connection.

While the particulars of the present invention and associated technology may be adapted for use with any type of tools, the examples discussed herein are primarily in the context of magnetic tip nut drivers.

FIG. 1*a* is a side view of a magnetic cleaner (10). The magnetic cleaner (10) comprises a housing (14) having a generally cylindrical shape. Housing (14) defines a first end (16) and an opposing second end (18). The apposing end (18) may be associated with an End Cap (24). Preferably, first end (16) is constructed at least partially of magnetically transparent material and is one exemplarily embodiment of a housing interface. Magnetically transparent material is defined as material that may be penetrated by magnetic fields without significant attenuation. Disposed within housing (14) is a magnetic element (32, FIG. 4). Magnetic element (32) is configured for associating with the first end (16) of housing (14) as described in more detail later.

Figure 2:
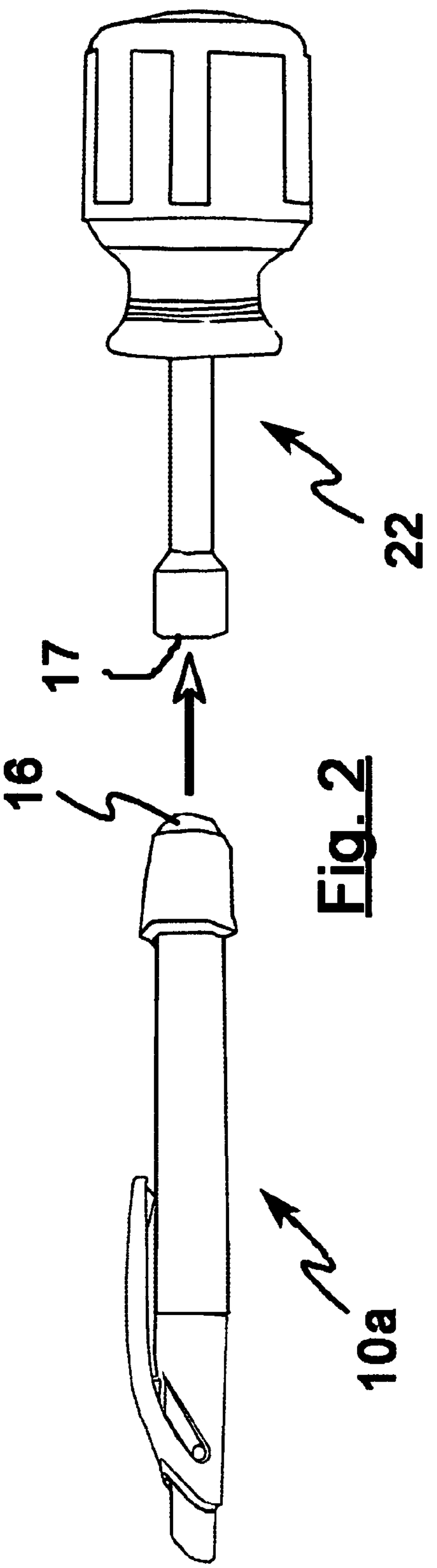
FIG. 2 is side view of a magnetic cleaner forming a magnetic association with a hand held nut driver.

The first end (16) is suitably sized for cleaning metal debris from a tool. For example, as shown in FIG. 2, if the magnetic cleaner (10) is to be use to clean a 10 mm nut driver (22), the first end (16) is suitably sized to clean metal debris from a 10 mm hole (17). It will be appreciated that one first end (16) size/shape may be suitable for cleaning a plurality of tool surfaces. Thus, one first end (16) size may be suitable for cleaning a complete nut driver set.

Figure 1B:
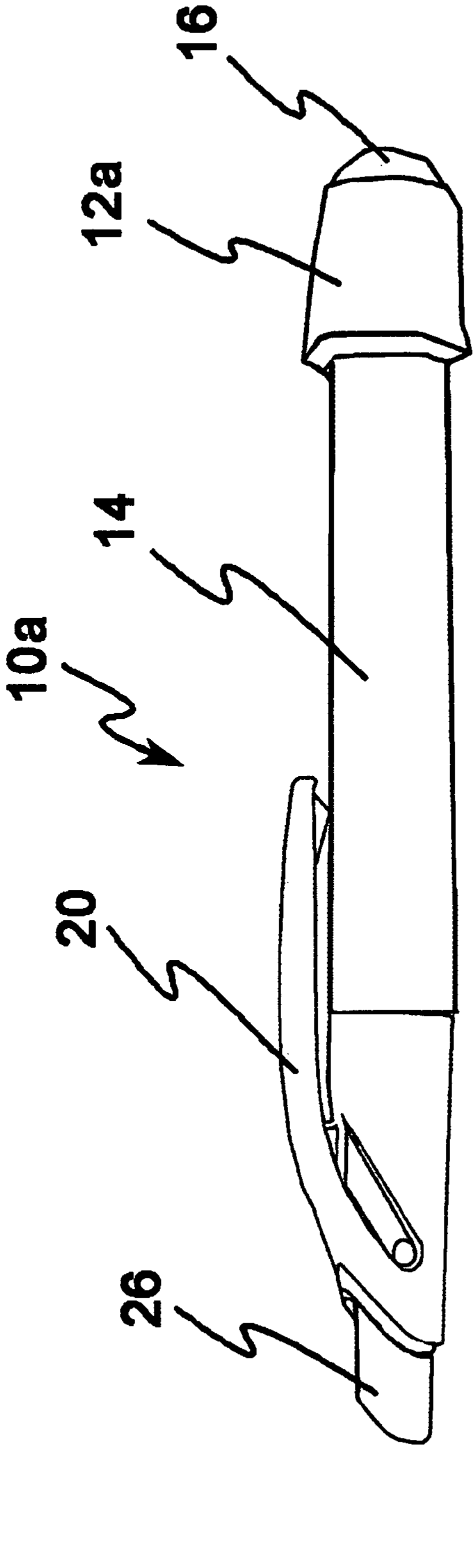
FIG. 1*b* is a side view of an alternative embodiment of a magnetic cleaner.
Figure 3:
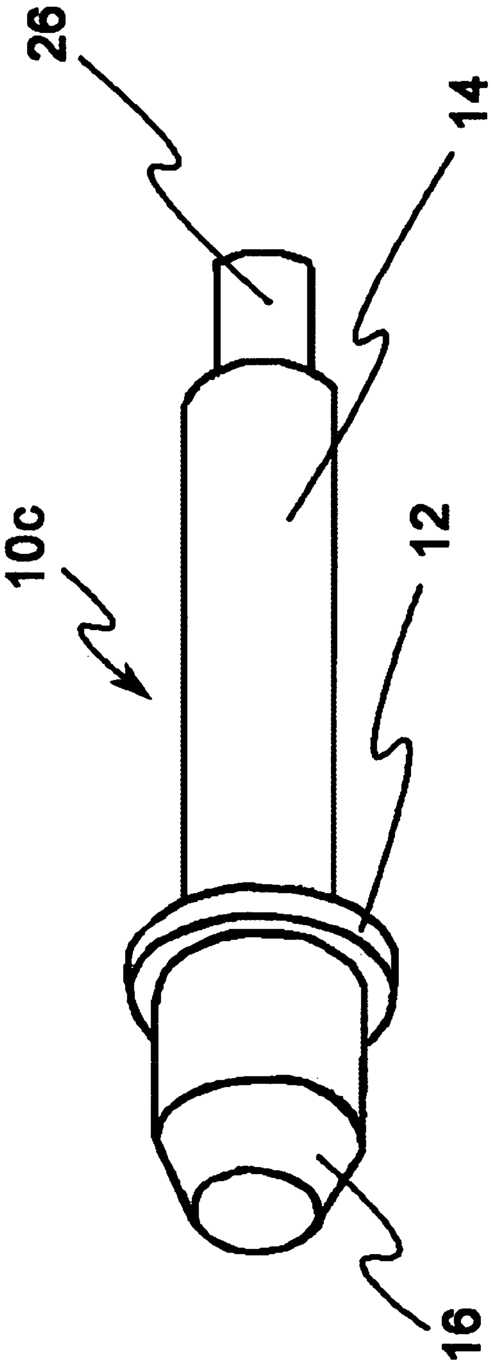
FIG. 3 is a side perspective view of a magnetic cleaner without an end cap according to another alternative embodiment of the present invention.

As shown in FIG. 1*a* and FIG. 1*b* respectively, the magnetic cleaner may comprise an annular plate (12) and/or a tip cover 12(*a*). The purpose of such features will be discussed later in this document. Both FIG. 1*a* and FIG. 1*b* embodiments comprise and optional end cap (24) with integral magnetic element mover (26). It will be appreciated that magnetic element mover (26) may be a separate component. End Cap (24) comprises an end cap interface (61, FIG. 4) configured for associating with second end (18). End cap (24) may further comprise clip (20) to facilitate storing magnetic cleaner (10, 10*a*) in a user's pocket. Alternatively, as shown in FIG. 3, the magnetic cleaner may not include an end cap (24). For this configuration, magnetic element mover (26) may be either an integral or component part of housing (14).

Figure 4:
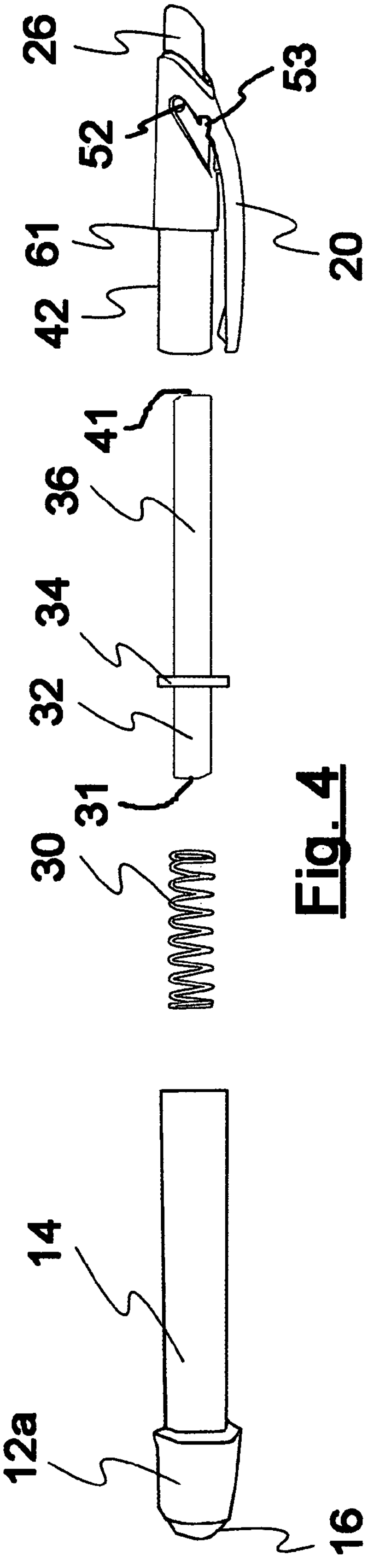
FIG. 4 is an exploded side view of the magnetic cleaner.
Figure 5:
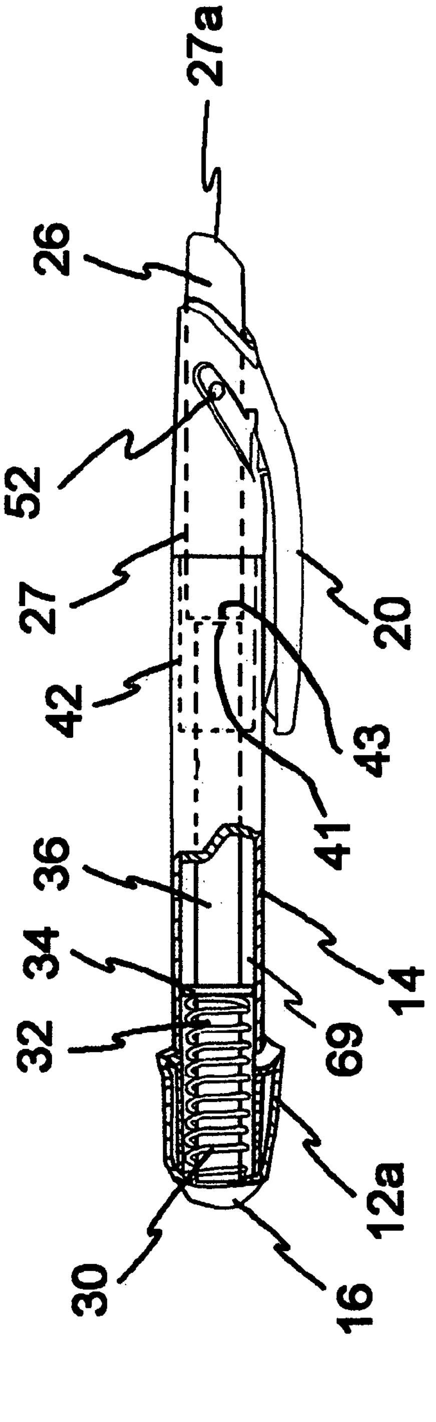
FIG. 5 is a side view of the magnetic cleaner in FIG. 4 with a partial cut away section.

Referring now to FIG. 4 and FIG. 5, the internal components of magnetic cleaner (10) are examined. The exemplary embodiment of magnetic cleaner (10) may further comprise a resilient element (30) in mechanical communication with said magnetic element (32) and housing (14). The resilient element (30) defines a bias force that tends to keep the magnetic element (32) from associating with first end (16). One embodiment of a resilient element is a spring. For some configurations the resilient element is constructed of nonferrous materials such a stainless steel or copper.

As shown in FIG. 5, the magnetic element (32) has been moved toward first end (16) and is at a point of association with first end (16). Generally speaking, the magnetic element is considered associated with the first end of the housing when either (a) the magnetic element is in position for forming a magnetic association with metal debris (associated with an object) of sufficient strength to remove the debris from the object or (b) the mechanical limit of the movement is reached. A magnetic element mover (26) is associated with housing (14) and is configured for moving magnetic element (32) toward first end (16) until magnetic element (32) is associated with first end (16). Component (36) may be a spacer element or it may simply be a continuation of magnetic element (32). Annular Wall (34) provides a compression point for resilient element (30) and may comprise part of a magnetic barrier as defined later. Annular Wall (34) also maintains a gap between magnetic element (32) and the sides of housing (14). Component (36) further comprises interface (41) that is placed in mechanical communication with interface (43) of magnetic element mover (26).

For this embodiment of the invention, magnetic element mover (26) is a plunger device. Magnetic element mover (26) is enclosed at least partially by housing (14) and end cap (24). Magnetic element mover (26) comprises mover body (27) having a generally cylindrical shape defining a first mover body end and a second mover body end. The first mover body end extends through housing (14) and end cap (24) and terminates at mover tip (27*a*). The second mover body end defines a mover body interface (43) that is in mechanical communication with magnetic element (32). Mover body (27) is slideably associated with the end cap (24) and housing (14).

A user may actuate magnetic element mover (26) by pressing on mover tip (27*a*) of mover body (27). Such action causes mover body interface (43) to press against component interface (41) which moves magnetic element (32) toward first end (16) thereby compressing resilient element (30). For the embodiment shown in FIG. 1*a*, when the user removes the pressure from magnetic element mover (26), resilient element (30) returns to the uncompressed stated thereby disassociating magnetic element (32) from the first end (16).

For the embodiment shown in FIG. 4 and FIG. 5, end cap (24) comprises a catch (53). As magnetic element mover (26) is moved toward first end (16), latch (52) associates with catch (53) thereby holding the magnetic element mover (26)

in an engaged position even after the compression force is removed from point (27*a*). The user presses magnetic element mover (26) again to disengage the association between latch (52) and catch (53).

Magnetic cleaner (10, 10*a*) may further comprise a resistive element that delays the disassociation of the magnetic element (32) from the first end (16). There are many well known technologies that may be use for such a resistive element. For example, area (69) between the inside surface of housing (14) and the outside surface of component (36) may be filled with a foam material that expands quickly and compresses slowly. Such technology is known and understood by those skilled in the art, and a detailed explanation thereof is not necessary for purposes of describing the method and system according to the present invention.

Figure 7:
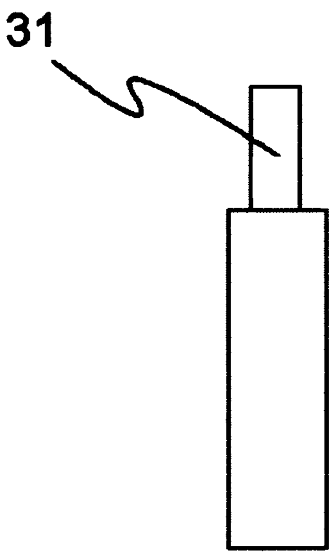
FIG. 7 is a side view of a first alternative embodiment of a magnetic element.
Figure 8:
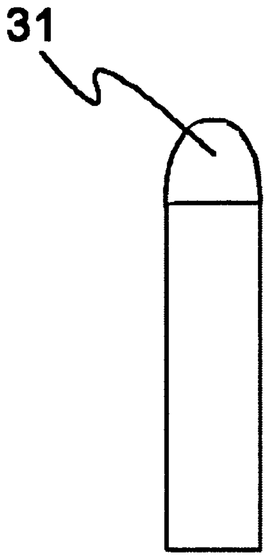
FIG. 8 is a side view of a second alternative embodiment of a magnetic element.

One embodiment of the magnetic element (32) is a permanent magnet. As shown in FIG. 4 and FIG. 5, magnetic element (32) has a generally cylindrical shape that fits well within housing (14). It will be appreciated that magnetic element (32) and housing (14) may take any number of shapes where the shape is selected to maximize the parameter of interest. For example, a particular magnetic element shape may maximize magnetic strength whereas a different magnetic element shape may maximize the ability to interface the cleaner with the surface of a tool to be cleaned. Similarly, a different housing shape may fit better into a user's hand thereby providing a more ergonomic design. Preferably, the tip area (31) of magnetic element (32) is formed to interface properly with first end (16). FIG. 7 and FIG. 8 depict alternative magnetic element (32) configurations.

The permanent magnet may be constructed from rare earth metals such as Neodymium-Iron-Boron (Neo magnets, sometimes referred to as "super magnets"), and Samarium-Cobalt. Special alloys, such as Aluminum-Nickel-Cobalt (Alnicos) and Strontium -Iron (Ferrites, also known as Ceramics), that are known to create suitable magnets may also be used. The selected material is "shaped" and constructed to have sufficient pull strength to remove metal debris from a magnetic element associated with a tool. For example, for magnetic tip nut drivers; the magnetic element of magnet cleaner (10) preferably has a pull strength that is at least about 2.5 times the pull strength of the magnetic tip nut driver. Thus, if a magnetic tip nut driver would lift about 4.5 lbs of ferrous steel under ideal conditions, the magnetic element (32) would preferably be able to lift about 12 lbs (or more) under the same conditions.

Figure 9:
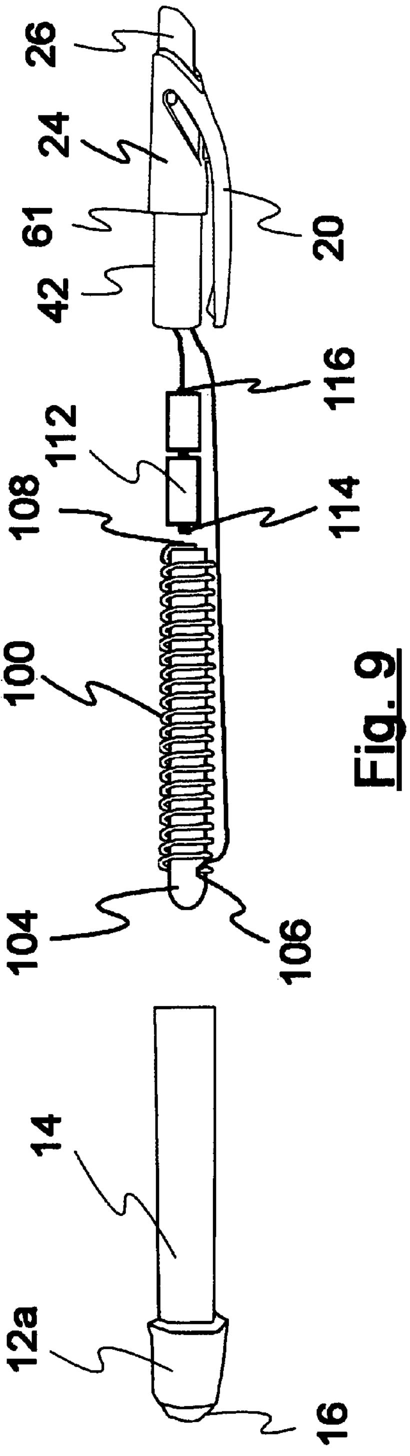
FIG. 9 is a side view of a magnetic cleaner comprising an electromagnet.
Figure 10:
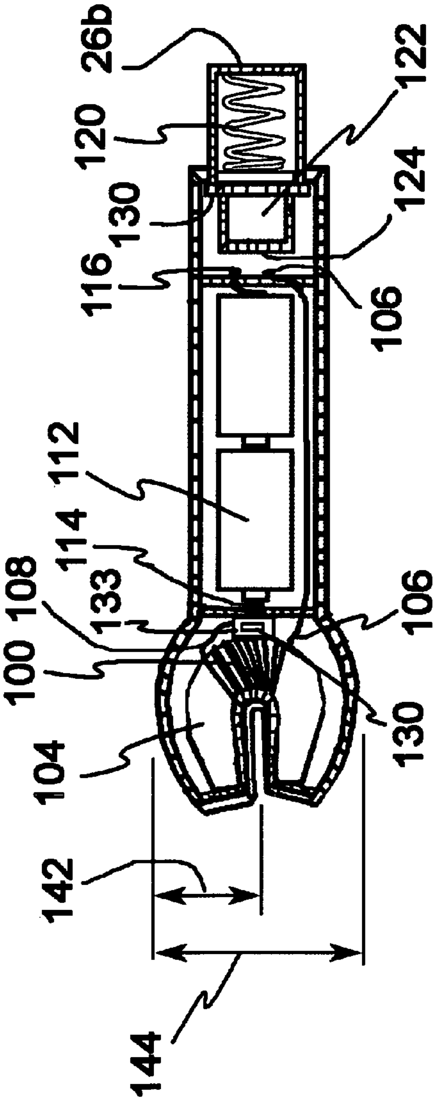
FIG. 10 is a side view with a partial cut away section of a magnetic cleaner comprising an alternative electromagnet embodiment.

FIG. 9 and FIG. 10 depict one alternative embodiment for magnetic cleaner (10) where magnetic element (32) is an electromagnet. For this embodiment of the invention, the magnetic element comprises core (104) extending through a cylinder defined by coil (100). Core (104) may be composed of any type of ferrous steel such as iron. A switch (not shown) housed in end cap (24) connects power source (112) to coil (100) thereby generating a current flow through coil (100) which generates an electromagnetic field that magnetizes core (104). The switch is actuated by pressing switch actuator (26*b*, FIG. 10). Power source (112) may be any suitable power source including one or more batteries.

As shown in FIG. 9, power source (112) comprises two batteries preferably providing a voltage potential of about 4.0 volts. Alternatively, three 1.5 Volt batteries by be used. Power source (112) has a first terminal connection (116) and a second terminal connection (114). Coil (100) comprises a first coil connection (106) and a second coil connection (108). First coil connection (106) is electrically associated with a first switch connection associated with a switch (now shown) housed in end cap (24). Similarly, the first terminal connection (116) of power source (112) is electrically associated with a second switch connection. The second coil connection (108) is electrically associated with the second terminal connection (114) of the power source. The switch is configured so that pressing switch actuator (26) causes the switching element to electrically associate the first switch connection with the second switch connection thereby allowing current flow through coil 100 as describe above.

FIG. 10 depicts an alternative embodiment of an electromagnetic. Housing (115) is suitably sized to house magnetic element (104) and power source (112). Switch actuator (26*b*) extends through one end of housing (115) and is retained in housing (115) by extension (130). Switch actuator (26*b*) further comprise internal block (122). Surface (124) of internal block (122) is electrically conductive so that contact (116) is electrically associated with contact (106) when switch actuator (26*b*) is pressed (engaged). Resilient component (120) returns magnetic switch actuator (26*b*) to the disengaged position when pressure is removed from switch actuator (26*b*).

For this embodiment, magnetic element (104) has the general shape of a horse shoe. As before, coil (100) comprises a first coil connection (106) and a second coil connection (108). It should be appreciated that power source (112) comprises two batteries and has a first terminal connection (116) and a second terminal connection (114). For this embodiment, resistive element (130) is connected between second coil connection (108) and second terminal connection (114) of power source (112). Resistive element (130) is preferably a variable resistor that is used to vary the current flow though coil (100). Such a configuration can be used to save power by using lower currents when possible (depending on the application). The apparatus may further comprise a light source for indicating the status of power source (112).

Magnetic cleaner (10) may further comprise a magnetic barrier. A magnetic barrier is generally defined as an object, such as a shield, that attenuates magnetic fields. A magnetic barrier may be desired to keep the magnetic cleaner (10) from attracting metal objects when not in use. Such a magnetic barrier may also simplify the task of removing metal debris from the cleaner after use.

Figure 6:
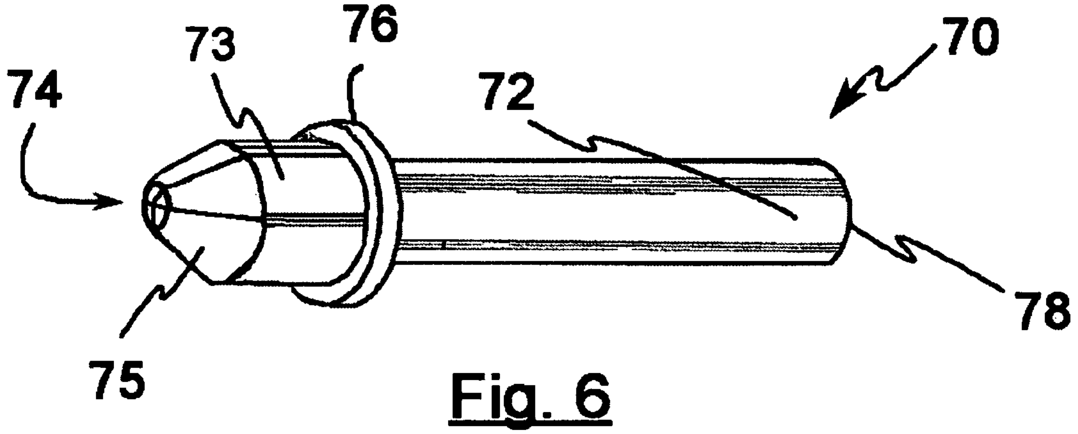
FIG. 6 is a side perspective view of magnetic barrier comprising a self-sealing end according to one embodiment of the present invention.

FIG. 6 depicts one embodiment of a magnetic barrier (70) having a generally cylindrically shaped body (72) defining a second barrier end (78) and a first barrier end (73) where the body (72) is suitably sized to at least partially enclose magnetic element (32). For this embodiment of the invention, magnetic barrier (70) forms a shield that fits into housing (14) of magnetic cleaner (10*c*) shown in FIG. 3 and encloses all of magnetic element (30).

The second barrier end (78) is configured for associating with (or receiving) a magnetic element mover such as a plunger. The first barrier end (73) defines a self-sealing passage (74) through which at least part of the magnetic element (32) travels when the magnetic element mover is actuated. For the exemplary embodiment shown in FIG. 6, second barrier end (78) comprises an opening configured for receiving magnetic element mover (26). When a user applies force to magnetic element mover (26) in the direction of first end (16), a surface of magnetic element mover (26) associates with the magnetic element (32) causing magnetic element (32) to press against self-sealing passage (74). As a result, resilient flanges (75) spread apart allowing magnetic element (32) to pass through the magnetic barrier (70) and associate with first end (16) of magnetic cleaner (10*c*). For the exemplary embodiment depicted in FIG. 3, when pressure is removed from magnetic element mover (26), resilient element (30) pushes magnetic element (32) back through self-sealing passage (74) and resilient flanges (75) move back together. Preferably, the magnetic element mover (26) comprises a magnetic barrier configured for attenuating magnetic fields that might otherwise penetrate the second barrier end (78). For example, the surface of magnetic element mover (26) that associates with magnetic element (32) may be constructed from the previously described shielding materials.

It will be appreciated that first end (16) is suitably sized to allow resilient flanges (75) to spread apart a predefined amount. Alternatively, first end (16) may be constructed at least partially of a resilient flexible/elastic material that expends to allow resilient flanges (75) to move apart. For such a configuration, the resilient first end (16) may provide at least part of the closing force required to disassociate magnetic element (30) from first end (16) and move flanges (75) back together. Such a configuration is particularly useful for embodiments where flanges (75) are not resilient.

Alternatively, no resilient components may be provided and the force required to both associate magnetic element (30) with first end (16) and disassociated magnetic element (30) from first end (16) is supplied by a user. Such a feature may be accomplished by using any number of well known technologies such as a magnetic element mover slideably associated with housing (14) and magnetic element (30) and configured for allowing a user to slide magnetic element (30) toward first end (16) and away from first end (16). Such a magnetic element mover may also be mechanically associated with flanges (75) and provide at least part of the force needed to open and close passage (74) for embodiments where passage (74) is not self-sealing.

Magnetic barrier (70) may further comprise annular plate shield (76). Such an embodiment may provide for a body (72) that is composed of magnetically transparent material to lower cost. The annular plate provides additional shielding so that metal debris more easily disassociates from the magnetic cleaner when magnetic element (32) is not penetrating self-sealing passage (74). The annular plate shield is optional but may be particularly useful for embodiments where magnetic barrier (70) comprises only first barrier end (73) and annular plate (76) with body (72) being composed of magnetically transparent material.

It is appreciated that strong magnetic fields generated by permanent magnets are harder to shield than typical electromagnetic fields (EMF) generated by electronic equipment as such fields tend to "saturate" the shielding material. Thus, the thickness of the shield material will vary depending on the strength of the magnetic element (32). There are many materials that can be used to construct a magnetic barrier in accordance with the present invention. Preferably, the shielding material is flexible, tough and offers moderate corrosion resistance.

One such material is nickel alloy shields (which have been used for many years to shield delicate electronic components from Electromagnetic Fields (EMFs)). Such shielding material can typically be cut with scissors and shaped by hand if necessary. Alternatively, cobalt based alloy may be used. Depending on the strength of the magnetic element (32), such alloys can provide effective shielding for shields having a thickness of only 0.00065" (16 microns). Less material typically means less weight and lower cost. As with nickel alloys describe previously, cobalt alloys may be cut with a scissors, shaped with fingers and taped or glued in place.

Attention now is turned to methodology for using a magnetic cleaner to clean a surface of a tool according to various embodiments of the invention. One such method is directed to removing metal debris from a tool comprising the step of configuring a magnetic element with a magnetic interface appropriately sized to associate with a tool surface associated with metal debris. FIG. 7 and FIG. 8 depict exemplarily embodiments of a magnetic element comprising a magnetic interface (31). The magnetic interface is simply the area of the magnetic element that is appropriately sized for forming a magnetic association between the magnetic element and metal debris contaminating the surface of a tool.

The next step is to associate the magnetic interface with a tool surface that is contaminated with metal debris. In this step a magnetic association between the metal debris and the magnetic element is formed that is stronger than the associated between the debris and the tool. In the next step the magnetic interface is disassociated from the tool while maintaining the magnetic association between the metal debris and the magnetic element. Such a process separates the debris from the tool.

An additional step comprises enclosing the magnetic element in a protective housing where the magnetic element's magnetic interface is associated with a housing interface comprised substantially of magnetically transparent material. The remainder of the housing may be composed of material that forms a magnetic barrier. Alternatively, a shield may be disposed between the magnetic element and the housing. Preferably, such a shield also provides the magnetic element with access to the magnetically transparent housing interface. For this embodiment of the method, the magnetic element may be movably associated with the housing so that the magnetic element's magnetic interface can be associated and disassociated with the housing interface. Such a feature provides for a method of minimizing stray magnetic fields when the method is not being practiced.

An additional step is to provide a resilient element that defines a bias force that tends to dissociate the magnetic element's magnetic interface from the housing interface. Also provided is a magnetic element mover configured for associating the magnetic element's magnetic interface with the housing interface when a user actuates said magnetic element mover. For this embodiment, the magnetic barrier may further comprise a self-sealing passage. At least part of the magnetic element travels through the self-sealing passage when the magnetic element mover is actuated.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is

1. An apparatus for cleaning metal debris from a magnetic surface defined by a tool, said apparatus comprising:

a housing having a generally cylindrical shape with a first end and an opposing second end;

wherein the first end of said housing is constructed at least partially of magnetically transparent material;

a magnetic element disposed within said housing, said magnetic element configured for associating with said first end wherein said magnetic element is a permanent magnet having a generally cylindrical shape and wherein said magnetic element is movably associated with said housing;

a resilient element in mechanical communication with said magnetic element, wherein said resilient element defines a bias force that tends to keep the magnetic element from associating with said first end;

a magnetic element mover associated with said housing and configured for moving said magnetic element toward said first end until said magnetic element is associated with said first end, wherein said magnetic element mover comprises a plunger element having generally cylindrical shape defining a first plunger end and a second plunger end wherein the second plunger end is in mechanical communication with said magnetic element within said housing and the first plunger end extends through the second end of said housing to a point outside of said housing;

wherein said plunger element is slideably associated with said housing and wherein said plunger is configured for being actuating when a force is applied to the first plunger end;

wherein said resilient element disassociates the magnetic element from said first end when a force is no longer applied to the first plunger end;

a magnetic barrier disposed within said housing, said magnetic barrier having a generally cylindrical shape and defining a first barrier end and a second barrier end wherein said magnetic barrier is suitably sized to at least partially enclose said magnetic element and wherein the first barrier end defines a self-sealing passage through which at least part of the magnetic element travels when the user presses said plunger and wherein the second barrier end is configured to receive said plunger; and wherein the first end of said housing is suitably sized for being associated with said magnetic surface thereby facilitating removal of metal debris from said magnetic surface.

2. An apparatus for cleaning metal debris from a tool as in claim 1, wherein said resilient element is a spring.

3. apparatus for cleaning metal debris from a tool as in claim 1, further comprising a resistive element that delays the disassociation of the magnetic element from the first end.

4. An apparatus for cleaning metal debris from a tool as in claim 1, wherein said magnetic barrier comprises at least one of (a) a nickel based alloy foil, and (b) a cobalt based alloy foil.

5. An apparatus for cleaning metal debris from a tool as in claim 1, wherein said housing further comprises an annular plate composed of a material that defines a magnetic barrier, said annular plate positioned between the magnetically transparent first end and the remainder of the housing body; and an end cap.

* * * * *